United States Patent
Ilijic

(10) Patent No.: US 10,222,775 B2
(45) Date of Patent: Mar. 5, 2019

(54) INTERRUPT EXCEPTION WINDOW PROTOCOL ON A DATA COMMUNICATION BUS AND METHODS AND APPARATUSES FOR USING SAME

(71) Applicant: Hubbell Incorporated, Shelton, CT (US)

(72) Inventor: Nik Ilijic, Glen Alpine (AU)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 15/779,327

(22) PCT Filed: Nov. 28, 2016

(86) PCT No.: PCT/US2016/063850
§ 371 (c)(1),
(2) Date: May 25, 2018

(87) PCT Pub. No.: WO2017/095739
PCT Pub. Date: Jun. 8, 2017

(65) Prior Publication Data
US 2018/0348722 A1    Dec. 6, 2018

Related U.S. Application Data

(60) Provisional application No. 62/261,025, filed on Nov. 30, 2015.

(51) Int. Cl.
*G06F 3/06* (2006.01)
*G05B 19/042* (2006.01)
(Continued)

(52) U.S. Cl.
CPC ......... *G05B 19/0423* (2013.01); *B65G 43/10* (2013.01); *G06F 13/24* (2013.01); *G05B 2219/25217* (2013.01)

(58) Field of Classification Search
None
See application file for complete search history.

(56) References Cited

U.S. PATENT DOCUMENTS 3,585,339 A * 6/1971 Hockenberry ........... B23H 7/18
219/69.16
2004/0091032 A1    5/2004 Duchi et al.
(Continued)

OTHER PUBLICATIONS

International Search Report dated Feb. 6, 2017, which issued in the corresponding Patent Application No. PCT/US2016/063850.

*Primary Examiner* — Hyun Nam
(74) *Attorney, Agent, or Firm* — Dickinson Wright PLLC

(57) ABSTRACT

An input/output (I/O) and control system for long distance communications and industrial applications having a bus and protocol for communications between field devices and a channel generator for monitoring and control of the field devices. The channel generator produces a pulse train such as an offset square wave with dual scan bus cycles having alternating A and B scan cycles that each comprise a plurality of channel windows assigned to the field devices. One or more channel windows in the A and B scan cycles has an exception interrupt window during which the control unit can detect a low level signal provided by a field device before its corresponding channel window in the dual scan bus cycle, thereby reducing system reaction time.

14 Claims, 13 Drawing Sheets

(51) Int. Cl.
*B65G 43/10* (2006.01)
*G06F 13/24* (2006.01)

(56) References Cited

U.S. PATENT DOCUMENTS

| | | | |
|---|---|---|---|
| 2007/0244951 A1* | 10/2007 | Gressel | G06F 7/582 |
| | | | 708/252 |
| 2008/0222333 A1* | 9/2008 | Barry | G06F 9/3861 |
| | | | 710/260 |
| 2009/0089547 A1* | 4/2009 | Moyer | G06F 9/3861 |
| | | | 712/205 |
| 2010/0030345 A1 | 2/2010 | Cole et al. | |
| 2013/0106615 A1 | 5/2013 | Prammer | |
| 2015/0028898 A1* | 1/2015 | Hanssen | G01R 21/06 |
| | | | 324/705 |
| 2015/0068871 A1 | 3/2015 | Tachibana et al. | |

* cited by examiner

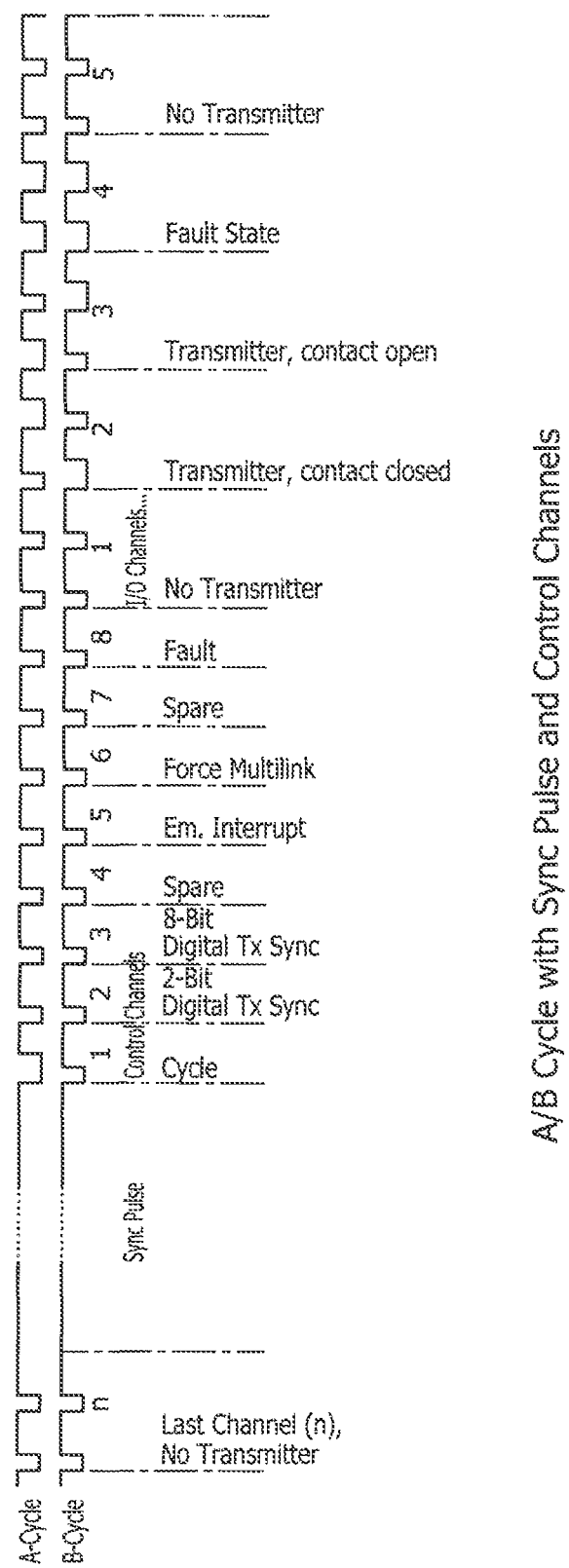

| Direction | Value | Scan Cycle A | | Scan Cycle B | |
|---|---|---|---|---|---|
| | | Chan-X1 | Chan-X2 | Chan-X1 | Chan-X2 |
| Incoming | ON | Space | Mark | Mark | Space |
| | OFF | Mark | Space | Space | Mark |
| | Fault | Mark | Mark | Mark | Mark |
| | Missing | Space | Space | Space | Space |
| Outgoing | ON | Space | Mark | Mark | Space |
| | OFF | Mark | Space | Space | Mark |

FIG. 9B

| Sync Pulse Time (ms) | Band width (%) | Channel Time (µs) | Response Time (ms) |
|---|---|---|---|
| 4 | 50 | 1200 | 74.8 |
| 6 | 75 | 1800 | 112.2 |
| 8 | 100 | 2400 | 149.6 |
| 10 | 125 | 3000 | 187 |
| 12 | 150 | 3600 | 224.4 |
| 14 | 175 | 4200 | 261.8 |
| 16 | 200 | 4800 | 299.2 |

Exception Window Response Times

FIG. 10

INTERRUPT EXCEPTION WINDOW PROTOCOL ON A DATA COMMUNICATION BUS AND METHODS AND APPARATUSES FOR USING SAME

BACKGROUND OF THE INVENTION

Field of the Invention

The present invention relates to a system, methods and apparatuses for an interrupt exception window protocol on a data communication bus.

Description of Related Art

Modem conveyors such as those employed in mining and manufacturing operations can exceed 4 kilometers (km) in underground installations and 10 km in overland installations. General conveyor operational parameters are monitored along the entire length of the installation, these include: belt wander, belt tear, belt slip and bearing temperatures, to name a few. These parameters are often difficult to monitor given the distances involved and the lack of power. Further, in the operation of any conveyor installation, there is a need for safety functions such as stopping the conveyor in an emergency situation, and safely remote isolating the conveyor for maintenance purposes, among other operations.

In addition, conveyor installations are, by their nature, hostile environments for any electrical equipment and cabling that may be installed on their superstructure. The equipment and particularly the cabling is subject to vibration, dust, falling material, rain, extremes in temperature and exposure to radiation, all of which can result in the introduction of electrical faults that can compromise the integrity and safety of these monitoring systems and require fast reaction times (e.g., for a controller to accomplish a basic emergency stop and isolation function at a remotely monitored device deployed along the conveyor).

SILBUS is an example of an existing input/output (I/O) and control system having a data communication bus deployed between a controller and field devices along a conveyor or other industrial system having equipment and/or monitored sensors distributed over or along a geographically large area or long distance for industrial applications and often in harsh environments. SILBUS is commercially available from Austdac Pty Ltd, an affiliate of Hubbell Incorporated, with offices in New South Wales and Queensland in the Commonwealth of Australia and in Pittsburgh, Pa. in the United States of America. SILBUS is a family of intrinsically safe (IS) fieldbus products designed for use in hazardous area underground mining or similar industrial applications. SILBUS provides data transmission and power on twisted pair wires for monitoring and control in industrial systems up to 10 km in length, including a control unit or channel generator that is in communication with a range of distributed modules (i.e., input and output devices) that monitor a range of signals such as digital, safety transmitters, voltage, current, temperature, and frequency.

The Austdac SILBUS method of conveyor monitoring and control uses a one cable approach to both monitoring and control of long distance conveyors with long distance transmission over 10 km. SILBUS employs a transmission method which allows for the combined transmission of safety-rated (e.g., SIL3 according to the international Standard IEC 61508 or its Australian edition, AS 61508) conveyor emergency stop signals with monitoring and control signals for field devices such as belt alignment switches, tilt switches, belt rip switches, as well as analog values relating to bearing temperature and vibration.

In SILBUS, all safety and standard digital inputs are line powered, eliminating the need for external power along the length of conveyor. For example, one field device that is commonly deployed along a conveyor is a pullkey, which is used to provide controlled stop functions for distributed plant conveyors. The Austdac pullkey or cable-pull limit switch type ESS3 has many applications in controlling a distributed plant such as conveyors or belts used in mining or materials handling industries. The pullkey can be operated using a front, centrally-located knob or each of two side-located, flexible cable-pull actuators. The side cable-pull actuators can be used in tensioned and non-tensioned systems. The control and monitoring transmitters in a pullkey are system powered, such that no external power source needs to be connected along the length of the conveyor.

SILBUS, however, has limitations in terms of noise immunity from high level noise sources such as variable frequency drives, and limitations with respect to the number of channels for input and output devices, as well as limitations on transmission distances on long overland conveyors and line powering of the distributed devices. For example, many large motors are used to power conveyors; these motors are switched on and off, change speed from low to high and trip off on overload. Variable speed motor drives are also employed. Because these activities all take place at the end of relatively long supply cables, the electrical environment is characterized by the presence of large switching transients, general electrical noise and harmonics.

A need therefore exists for a data communications bus in a system that accommodates more devices which can be deployed over greater distances and has improved noise immunity. Greater numbers of channels, however, can result in potentially longer reaction times (e.g., time needed for a control unit to detect reporting of a problem from inbound communication of one or more field devices and to send control signals to perform a safety function). A need therefore also exists for a data communication bus protocol that reduces the time needed to detect and respond to a control input in the system where the data communication bus is deployed.

SUMMARY OF THE INVENTION

The above and other problems are overcome, and additional advantages are realized, by illustrative embodiments of the present invention.

In accordance with illustrative embodiments of the present invention, methods and systems are provided to implement a bus protocol for interfacing a control unit to plural devices connected to the bus comprising A method of implementing a bus protocol for interfacing a control unit to plural devices connected to the bus comprises generating a pulse train comprising a plurality of cycles for transmission on the bus, each of the cycles comprising a low voltage level portion for a designated period of time and a high voltage level pulse for a designated period of time that indicates a space, at least some of the cycles corresponding to respective channel windows assigned to respective ones of the plural devices, each of the plural devices being able to indicate a state to the control unit by pulling down voltage on the bus during the low voltage level portion of its channel window and the channel unit responding by delaying a rising edge of the high voltage level pulse a selected amount of time in the channel window to indicate a mark. The pulse train employs dual scan bus cycles comprising alternating A and B scan cycles where each A scan cycle and each B scan cycle comprises the channel windows and at least one of control bits and synchronization bits. The plural devices and control unit are synchronized to ensure that the plural devices transmit and receive during their corresponding channel windows and that, when the control unit samples the pulse train at during the channel windows, the control unit associates the samples to the corresponding ones of the plural devices. The dual scan bus cycles are employed to indicate in a channel window any one of four states comprising Device ON, Device OFF, Fault and No Device using binary combinations of a mark and a space in the channel windows of the A and B scan cycles that are assigned to a selected one of the plural devices. At least one of the channel window pulses in at least one of the A and B scan cycles is configured to have an exception interrupt window comprising a second low level portion of selected duration during which the control unit can detect a low level signal provided by at least one of the plural devices by pulling down voltage on the bus during the pulse train but outside of its assigned channel window. Alternatively, at least one additional pulse in at least one of the A and B scan cycles is configured to behave as an exception interrupt window comprising a low level portion of selected duration during which the control unit can detect a low level signal provided by at least one of the plural devices by pulling down voltage on the bus during the pulse train but outside of its assigned channel window.

In accordance with aspects of illustrative embodiments of the present invention, the control unit can detect the low level signal provided by at least one of the plural devices during an exception interrupt window in at least one of the A and B scan cycles prior to detecting the low level signal provided by that device in its next assigned channel window in the dual scan bus cycles of the pulse train.

In accordance with aspects of illustrative embodiments of the present invention, implementing the bus protocol further comprises designating the detection of a low level signal from one of the plural devices in at least a selected number of the exception interrupt windows before an interrupt is valid to the control unit.

In accordance with aspects of illustrative embodiments of the present invention, implementing the bus protocol further comprises generating the pulse train to have the exception interrupt window in the high voltage level pulse of at least one of the plurality of cycles. For example, the high voltage level pulses in the cycles can vary in duration within a cycle depending on whether they are pulse width modulated as a mark or a space. Mark timing and space timing are designated such that the pulses having a mark are initiated later in their respective cycles than the pulses having a space, and the generating of the exception interrupt window is initiated later in their corresponding cycles than the mark timing.

In accordance with aspects of illustrative embodiments of the present invention, implementing the bus protocol further comprises generating the pulse train to have the exception interrupt window in each of a selected number of the plurality of cycles in at least one of the A and B scan cycles. For example, implementing the bus protocol further can comprise generating the pulse train to have the exception interrupt window in each of a selected number of the plurality of cycles in each of the A and B scan cycles. For example, implementing the bus protocol further can comprise generating the pulse train to have the exception interrupt window in selected intervals of the plurality of cycles in each of the A and B scan cycles.

In accordance with aspects of another illustrative embodiment of the present invention, at least one of the A scan cycle and the B scan cycle further comprises an exception pulse at selected intervals among the channel windows, the exception pulse providing an interrupt exception window and having a low level portion during which the control unit can detect a low level signal provided by at least one of the plural devices by a pull down of the voltage on the bus during the pulse train but outside of its assigned channel window. For example, an exception pulse can be generated after a channel window corresponding to every $n^{th}$ one of the plural devices in a pulse train scan cycle. The interrupt exception window can have same channel bandwidth as each of the channel windows in the corresponding pulse train scan cycle. Alternatively, the duration of the interrupt exception window and the amount of bandwidth available in the cycle following the interrupt exception window can be different from the channel bandwidth of the channel windows preceding the interrupt exception window. For example, the duration of the interrupt exception window and the amount of bandwidth available in the cycle following the interrupt exception window can vary by allocating different proportions of a cycle to the portions of the channel bandwidth between in an initiation point of a mark in a channel window and an interrupt exception window occurring thereafter.

In accordance with aspects of illustrative embodiments of the present invention, an interrupt detected via the exception interrupt window can be broadcasted to other devices on the bus.

Illustrative embodiments and respective aspects thereof can be used with other illustrative embodiments.

Additional and/or other aspects and advantages of the present invention will be set forth in the description that follows, or will be apparent from the description, or may be learned by practice of the invention. The present invention can comprise an I/O and control system and data communication bus protocol and methods for forming and operating same having one or more of the above aspects, and/or one or more of the features and combinations thereof. The present invention can comprise one or more of the features and/or combinations of the above aspects as recited, for example, in the attached claims.

BRIEF DESCRIPTION OF THE DRAWINGS

The present invention will be more readily understood with reference to the illustrative embodiments thereof as shown in the attached drawing figures, in which:

FIG. 9A is a diagram of a pulse train employed in a data communication bus protocol in accordance with an embodiment of the present invention.

FIG. 9B is a table providing scan cycle states and corresponding values for the pulse train of FIG. 9A.

FIG. 10 is a table of exception window response times of the I/O and control system in accordance with an embodiment of the present invention.

Throughout the drawing figures, like reference numbers will be understood to refer to like elements, features and structures.

DETAILED DESCRIPTION OF ILLUSTRATIVE EMBODIMENTS

Figure 1:
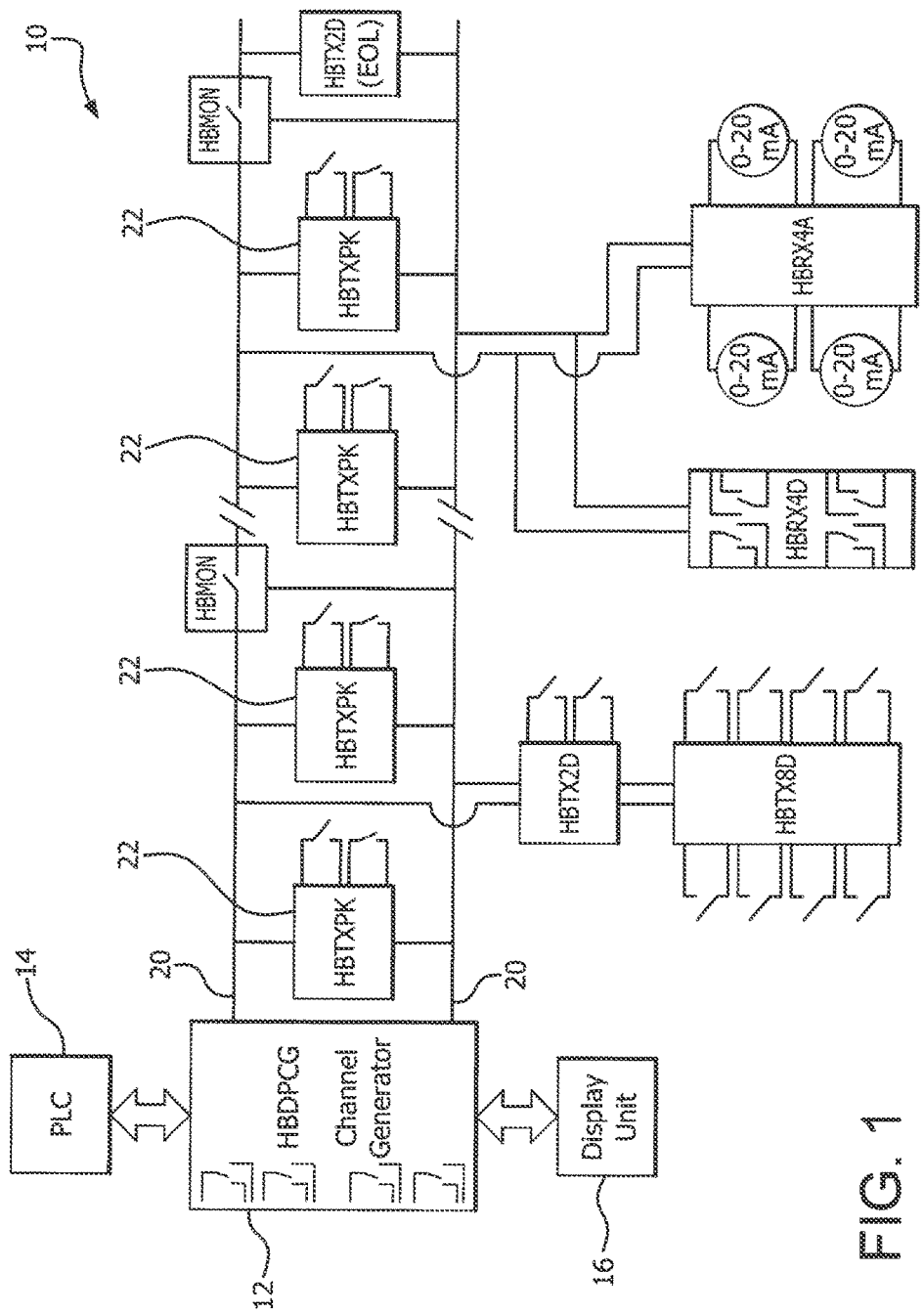
FIG. 1 is a block diagram of an input/output (I/O) and control system employing a data communication bus protocol in accordance with an embodiment of the present invention.

Reference will now be made in detail to embodiments of the present invention, which are illustrated in the accompanying drawings. The embodiments described herein exemplify, but do not limit, the present invention by referring to the drawings. As will be understood by one skilled in the art, terms such as up, down, bottom, and top are relative, and are employed to aid illustration, but are not limiting.

The following definitions are provided for reference in connection with the following description of various aspects of illustrative embodiments of the present invention:

ADC: analog to digital converter, channel pulse or window: a cycle comprising low voltage level portion for a designated period of time, and a high voltage level portion for a designated period of time, channel bandwidth: total time allocated to each channel pulse (e.g., default value of 2400 us), channel generator or control unit: a controller module that generates an outbound waveform and receives inbound transmissions, common line: a low voltage (e.g., 0 V) return line, high floor (or high side) value or threshold: an upper current level required for valid inbound signal transmission, inbound: transmission from a line device to the channel generator, low floor (or low side) value or threshold: lower current level required for inbound signal transmission, mark: inbound or outbound transmission within a channel's window, outbound: transmission from the channel generator to line device, pulse pair: two pulses which represent the state of a channel, receiver: a line device that listens for outbound messages, signal line: a high side or voltage line with waveform generated by the channel generator, space: inbound or outbound non-transmission within a channel's window, transmitter: a line device that transmits inbound messages.

With reference to FIG. 1, an I/O and control system 10 is provided in accordance with an illustrative embodiment of the present invention. The I/O and control system 10 is advantageous because it can support a larger number of channels and yet have a reduced system reaction time as compared to other I/O and control systems, among other reasons. As described below, the I/O and control system 10 employs a data communication protocol having a recurring global exception pulse or interrupt exception window (e.g., recurring every selected number of channels) during which any transmitter can generate a response or indication (e.g., pull a signal low during a high period within a selected window or time associated with designated channels of a pulse communication system) for detection by the channel generator of the pulse communication system. Having a recurring exception window in a pulse communication system that employs, for example, two passes or scan cycles allows detection of a transmitter-requested exception at multiple points within the two passes or single pass and therefore more quickly for faster reaction times (e.g., to respond with shut-down or other operation).

The I/O and control system 10 comprises Programmable Logic Controller (PLC) 14 and a display unit 16, which are shown connected to a control unit or channel generator 12. The PLC 14 and display unit 16 can be connected to the channel generator 12 via Ethernet or RS485 MODBUS, for example. The control unit or channel generator 12 is connected to a plurality of I/O modules via a bus indicated generally at 20. The I/O modules indicated generally at 22 can include, but are not limited to, one or more pull-key transmitters (HBTXPK), network monitor (HBMON), and other types of transmitters such as a two channel digital transmitter (HBTX2D), an eight channel digital transmitter (HBTX8D), a four channel digital receiver (HBRX4D), and four channel analog receiver (HBRX4A). As shown, one of the modules is operated as an end of line (EOL) monitor.

The illustrative I/O and control system 10 can be used for a target industry such as the overland conveyor industry and its associated activities such as stacker reclaimers and port coal loading facilities. The illustrative I/O and control system 10 can be used for other industrial and commercial applications such as car parks (e.g., having parking space sensors for parking space availability tracking), lighting automation, and other systems which employ monitoring by and control of many distributed input and/or output (I/O) devices or modules. The I/O modules are distributed or positioned at locations along a conveyor, for example, or other line or pattern (e.g., parking lot grid lines) depending on the system 10's industrial or commercial application. The I/O modules are connected to each other and the controller or channel generator 12 by the bus 20.

The bus 20 can be, for example, any cable that allows communication and provides power over long distances. The bus can be a two wire system. For example, the bus can employ twisted pair for improved noise and crosstalk immunity as the cable is key area for noise immunity.

The I/O and control system 10 can supply sufficient power to supply line powered I/O modules or devices at a minimum 12VDC from the controller 12, or a supply of 48VDC to allow for a required number of line powered devices depending on the particular application for which the system 10 is being used. For example, the supply of a larger voltage level (e.g., 48VDC) at the controller 12 can allow for better power distribution on long cable runs where there may be significant voltage drops on the line. Channel bandwidth can be selected and altered to supply sufficient power to I/O modules or devices connected via the bus and deployed along a conveyor or other line or pattern depending on the system 10's industrial or commercial application.

Due to the longer conveyor or commercial or industrial line lengths needed, a larger number of I/O modules or devices are also needed. The illustrative I/O and control system 10 can be configured to operate over longer transmission distances. Further, the I/O and control system 10 can be configured in accordance with illustrative embodiments of the present invention to operate with greater numbers of I/O channels, and to power greater numbers of transmitters from the bus 20, to realize significant improvements and advantages over SILBUS and other existing I/O and control systems. In addition, and in accordance with an illustrative embodiment of the present invention, the I/O and control system 10 is scalable, that is, it can be configured to increase the number of channels with a decrease in refresh rates and vice-versa via the controller 12. Further, in accordance with another aspect of the illustrative embodiment of the present invention, all of the I/O modules are automatically self-configuring for channel bandwidth and number of channels.

Figure 2:
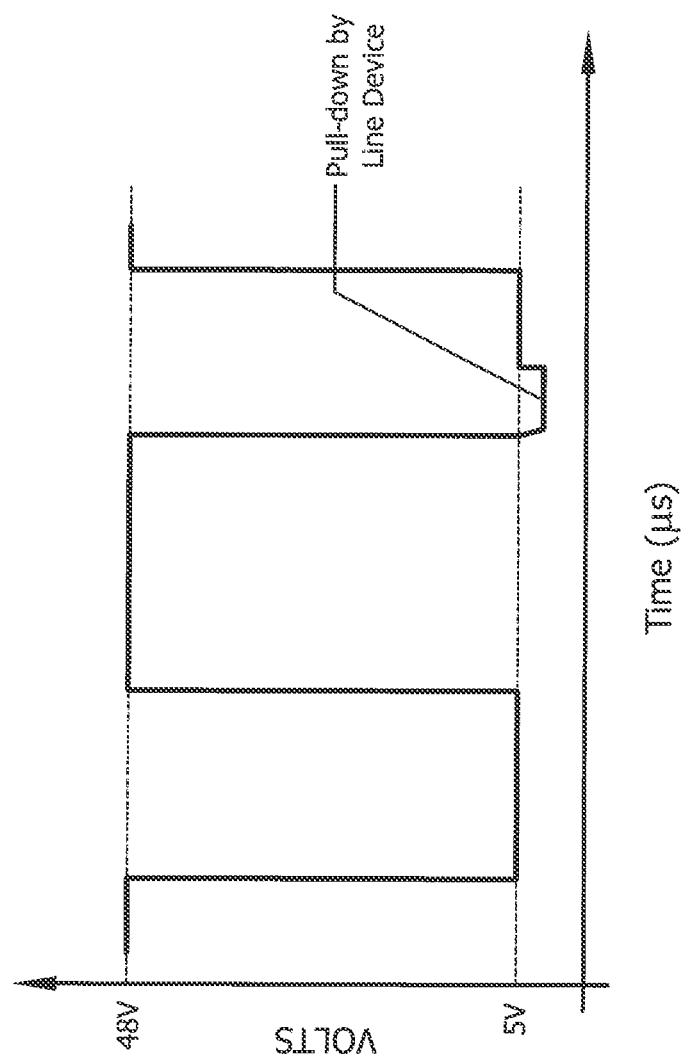
FIG. 2 is a diagram illustrating bus signal voltage levels of an example physical layer of the I/O and control system in accordance with an embodiment of the present invention.

The physical layer of the I/O and control system 10 will now be described with reference to FIG. 2 and in accordance with an illustrative embodiment of the present invention. To maximize the distance covered by the system 10, the high voltage level is 48VDC, for example. The voltage level at the low level shall be 5VDC, for example. Additionally, for example, no line devices (e.g., I/O modules) draw off the line at 9VDC or lower. When producing the low level supply voltage, the controller 12 passes the voltage through a current sensing circuit. Any devices that need to drive data in its assigned channel during the low voltage period can pull-down on the signal line to the common line on the bus 20. Since there is no load on the low voltage level (5VDC), its output should remain near that level for the length of the line. The high level voltage side allows for large voltage drops in the bus signal and devices on the bus should remain operational down to 12VDC. The use of inbound current sensing devices in the channel generator 12 provides significantly increased levels of EMC protection over the voltage load and edge sensing techniques used in SILBUS. A minimum of 2A at 48VDC is generally available from the channel generator or controller 12.

Figure 3:
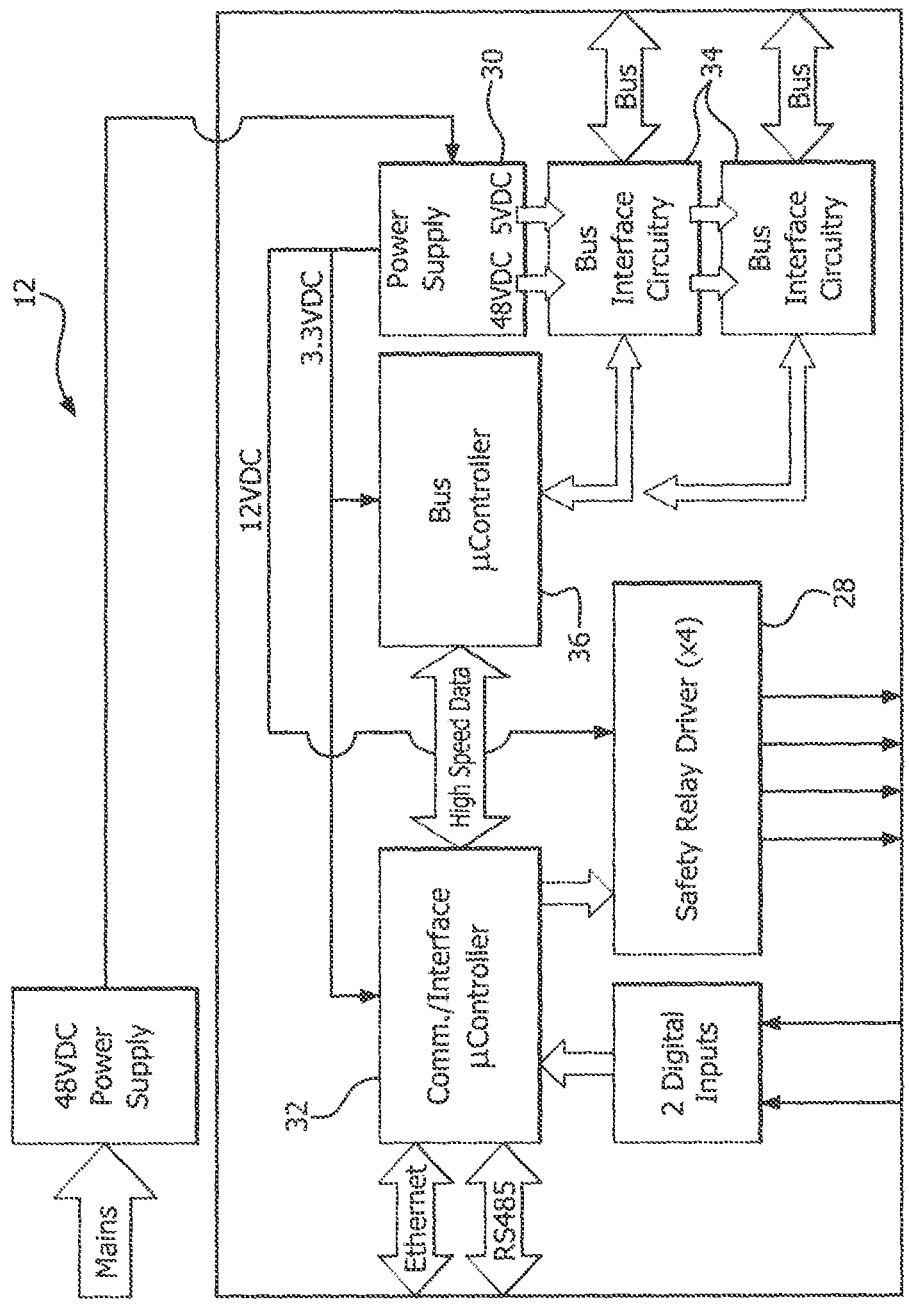
FIG. 3 is a block diagram of a control unit employed in the I/O and control system in accordance with an embodiment of the present invention.
Figure 4:
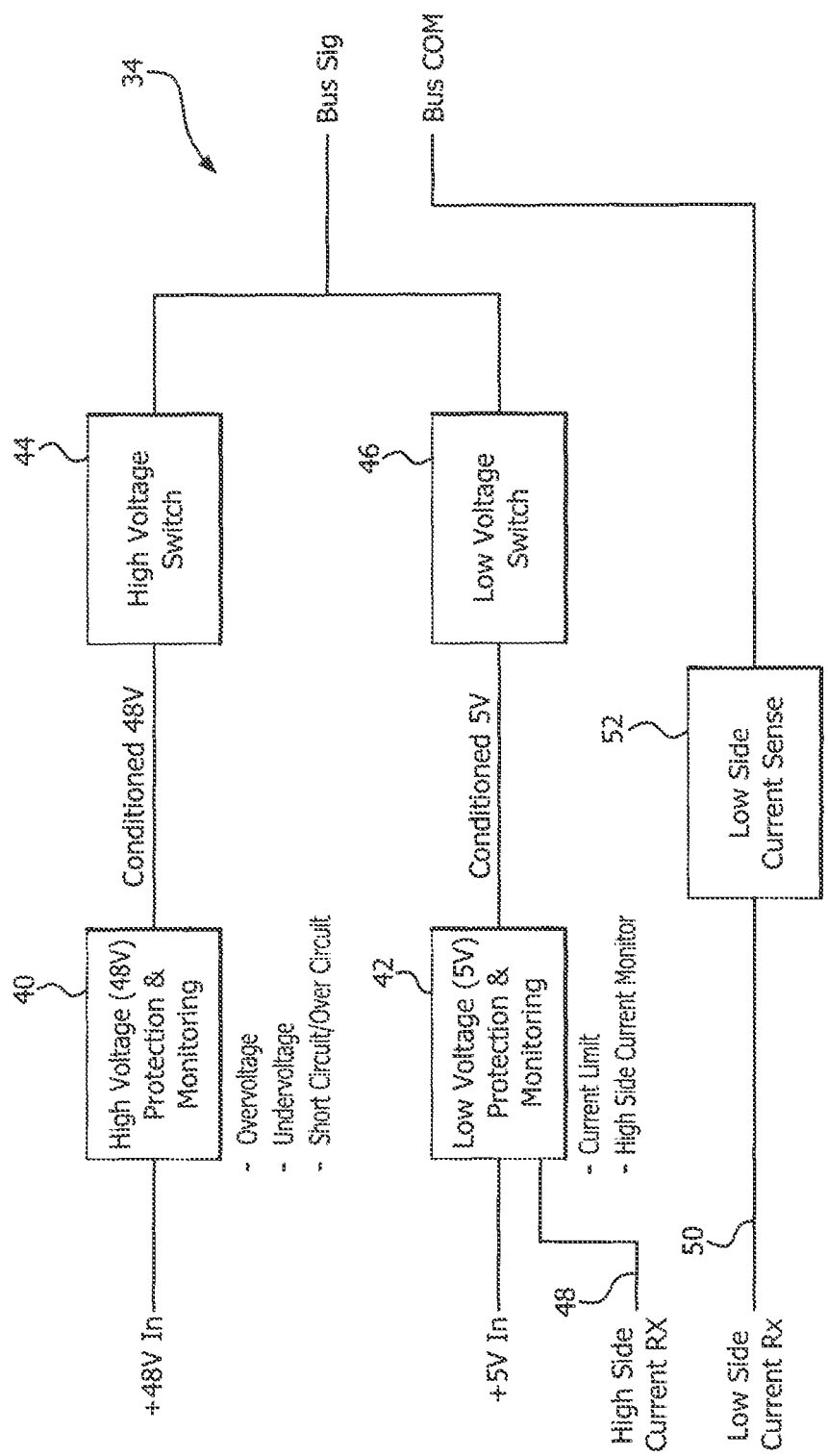
FIG. 4 is a block diagram of bus interface circuitry employed in the control unit of FIG. 3 and constructed in accordance with an embodiment of the present invention.

With reference to FIGS. 3 and 4, an example of a dual port controller or channel generator 12 is provided which generates the bus signal, senses incoming transmissions from line devices 22 on the bus 20, and interfaces to the outside world (e.g., via an Ethernet or RS485 interface). A 48VDC power source is connected to a power supply 30 in the channel generator 12 that, in turn, provides operating voltages such as 12VDC for a relay driver 28 and 3.3VDC for other electronic components such as a microcontroller 36, one or more bus interface circuits 34, and a communications interface 32. The channel generator 12 has channel logic decoding which in turn may be used to drive relays for controlling or signaling external devices. The channel generator 12 can have LEDs (not shown) for indicating health of the controller, power source and/or bus 20, Ethernet activity, and local digital input.

FIG. 4 is a block diagram of a channel generator bus interface 34 in accordance with an illustrative embodiment of the present invention. High (48V) and low (5V) voltage protection and monitoring modules 40 and 42 provide conditioned high and low voltage signals to respective high and low voltage switches 44 and 46 to drive the outbound bus signal in accordance with a protocol as described in more detail below. High side and low side current signals 48 and 50 carry incoming or inbound transmissions from line devices on the bus 20 that are detected via the current sense circuits 42 and 52.

Figure 5A:
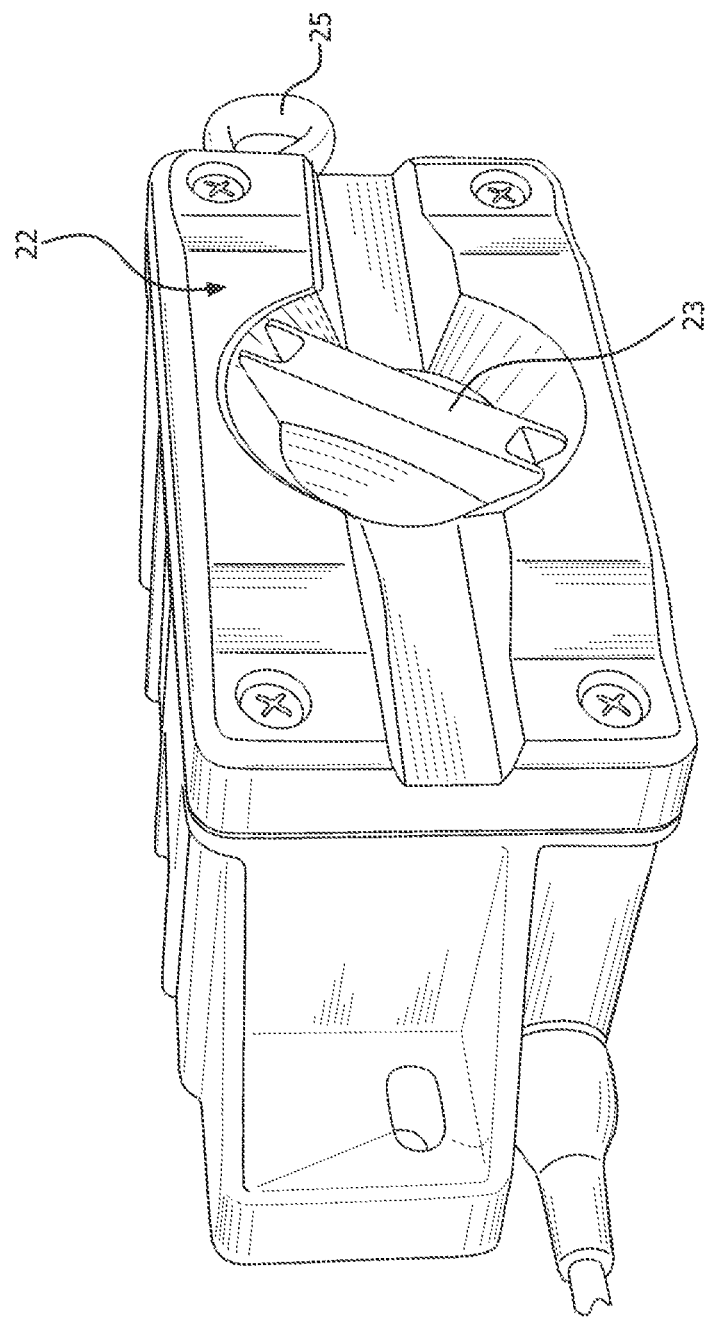
FIGS. 5A and 5B illustrate, respectively a perspective exterior view and a block diagram of an example field device in the I/O and control system in accordance with an embodiment of the present invention such as a pullkey housing in which a transmitter is deployed.
Figure 5B:
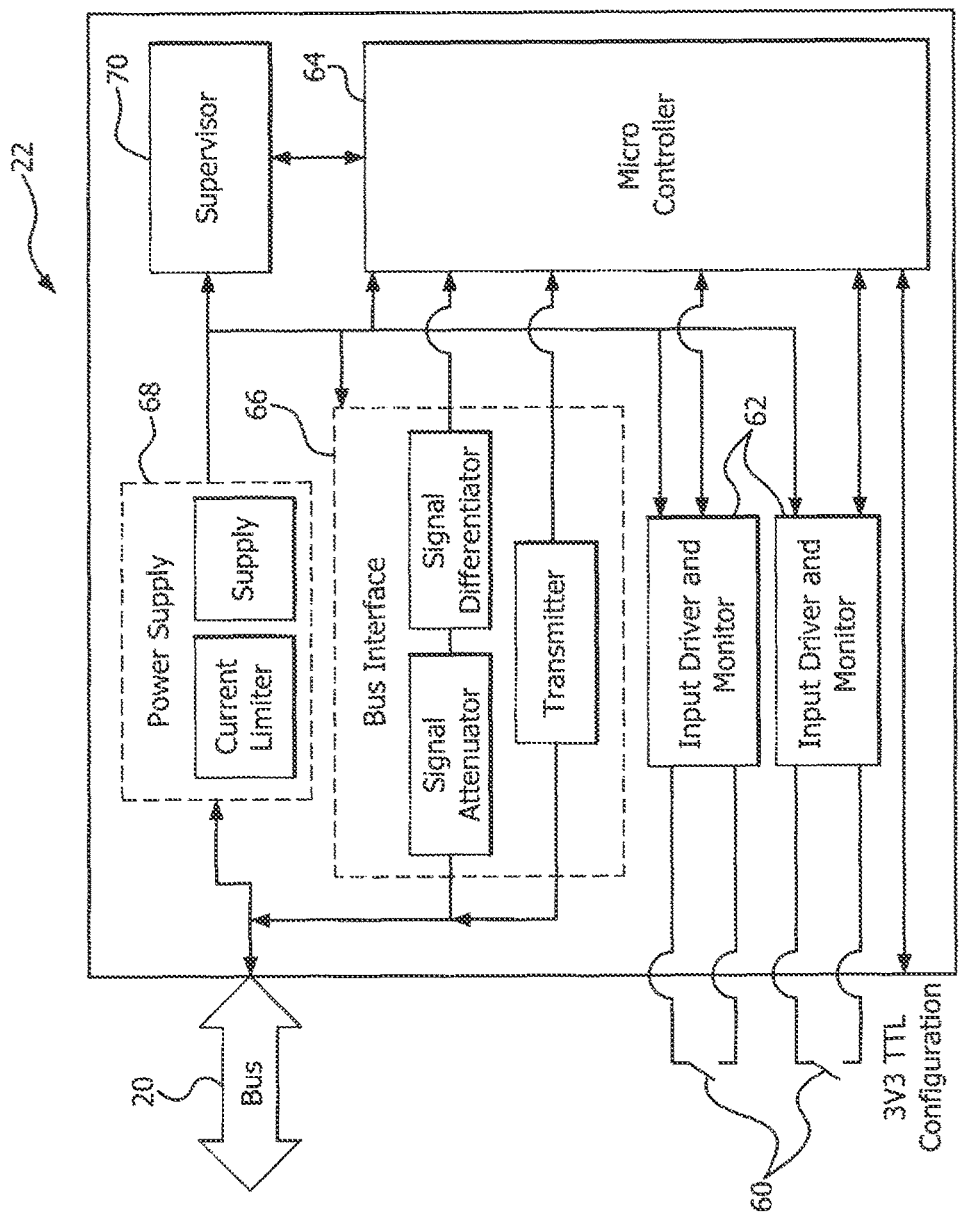

FIGS. 5A and 5B depict, respectively, a pull-key transmitter (HBTXPK) 22 as an example I/O module or line device 22 constructed in accordance with an illustrative embodiment of the present invention. With reference to FIG. 5A, the two-input transmitter 22 is fitted into a pull-key (or cable-pull limit switch) assembly. The pullkey is used to provide controlled stop functions for distributed plant or conveyors. The pullkey can be operated using the front centrally located knob 23 or each of the two side located flexible cable-pull actuators 25. The side cable-pull actuators 25 can be used in tensioned and non-tensioned systems.

With reference to FIG. 5B, the transmitter 22 has two inputs 62 driven by voltage free contacts 60. One contact 60 is Normally Open (NO) and the other contact 60 is Normally Closed (NC). It is expected that the change-over of contacts occurs at the same time and only a single output channel is required. If both inputs are in the same state, a fault condition is considered to exist. The microcontroller 64 and bus interface 66 process the inputs 62 for transmission on the bus 20. A power supply 68 receives power (e.g., a high voltage signal) from the bus to provide power to the components of the transmitter 22. A supervisory circuit 70 can be provided to monitor the health of the transmitter such as power level.

By way of another I/O module or line device 22 example, a two digital input transmitter (HBTX2D) is like the pull-key transmitter (HBTXPK). Transmitter has two inputs 62 driven by voltage free contacts 60. Rather than a single output with dual input with redundancy, the dual input transmitter outputs two separate states on different channels. An eight digital input transmitter (HBTX8D) has inputs driven by voltage free contacts and their states are output on 8 separate I/O channels on the bus 20. The eight-channel digital transmitter is a small line powered transmitter capable of transmitting the status of eight voltage free contacts and can be used liar sensing the status of remote voltage free contacts such as emergency stop, pullkey, belt wander, belt rip and blocked chute switches on long conveyors to name but a few. The transmitter can be line powered from the two-wire bus 20 network cable, thereby reducing installation and cabling costs.

Additional examples of I/O modules 22 include, but are not limited to, a four channel analog transmitter (HBTX4A) with 0-2VDC or 0-20 mA input Data (e.g., 12 bits+4 CRC bits) is transferred via the Datalink protocol over the configured number of channels. A four channel analog receiver (HBRX4A) has 0-2VDC or 0-20 mA output. Data (e.g., 12 bits+4 CRC bits) is transferred via the Datalink protocol over the configured number of channels.

Another example I/O module 22 is a four channel receiver (HBRX4D) with digital (relay) outputs. The HBRX4D can receive from just a few through to many digital ON/OFF signals from the control system 10 bus network to control the four relay outputs directly or via complex multi-term logic functions. The digital receiver has four output relays controlled by up to six logic resolvers (4 physical linked to a relay and 2 virtual may be used to drive a channel) capable of implementing OR, AND, NOR, NAND and FLIP logic functions. Each resolver has an independently configurable output ON and OFF delay filter to allow implementation of simple timer functions. Further, a dual channel temperature transmitter (HBTX2T) has a temperature input designed to work with a standard two, three or four wire PT100 temperature sensor. The temperature transmitter can be configured to operate on one of two temperature ranges, −10° C. to +100° C. or −20° C. to +200° C., which makes the module particularly suited to monitoring hearing or similar plant temperatures via the bus 20 network without any requirements for additional power. A network monitor reports back to the channel generator and control unit 12 various network and line parameters such as, but not limited to, line voltage, slew rate, reflection, and ground leakage. The monitor (HBMON) may also be used to isolate downstream parts of the network to help with fault isolation.

The applications of the I/O modules (e.g., transmitters and receivers) are not limited to conveyor installations, but can be used in any application where the status of a remote switch contact or relay contact is required to be monitored, for example.

The data layer of the I/O and control system 10 will now be described in accordance with an illustrative embodiment of the present invention. The basis of data transmission along the bus 20 is pulse width modulation (PWM) for outbound communications (e.g., from control unit 12 to line devices 22 such as the pullkey transmitter (HBTXPK)) and current detection for inbound communications (e.g., from line devices or I/O modules 22 to the control unit or channel generator 12). The channel generator 12 continuously maintains an offset square wave of a configurable frequency, wherein each of plural channel windows or pulses comprises a low voltage portion and a high voltage portion. A channel window or pulse can be used to represent one I/O channel described below. Alternatively, a designated plural number (e.g., 2 or more) of channel windows or pulses can be used to represent one I/O channel. The number of channel pulses and therefore the corresponding number of channels (e.g., I/O channels described below) can be configured in the channel generator 12. The typical number of channels is 64, 128, 256 or 512 (with 1024 and 2048 available for large systems). Further, as described in co-pending application of Nik Ilijic filed even date herewith and entitled "Systems, Apparatuses and Methods for Synchronization Pulse Control of Channel Bandwidth of a Data Communication Bus," the controller or channel generator 12 can be self-configuring to automatically reconfigure the channel bandwidth.

The I/O and control system 10 is a distributed I/O system such that not all communications are from the field devices 22 to the control unit 12 or vice versa. For example, communications can be from field device 22 to field device 22. The I/O and control system 10 couples the inbound to the outbound communications, allowing multiple receivers (e.g., among the lines devices 22 and control unit 12) to sample or eavesdrop on a single transmitter device, thus providing true distributed I/O. Coupling is achieved by the channel generator 12 sampling the inbound current detection and immediately altering the outbound pulse width modulation to reflect the state of the inbound channel. In some applications, the inbound and outbound communication can be un-coupled and is referred to as split I/O.

Example inbound and outbound channels in a pulse train on the bus 20 will now be described with reference to FIGS. 6A, 6B, 7A, 7B, 9A and 9B. FIG. 9A depicts a complete scan of the bus 20 which consists of, for example, two complete cycles of a pulse train (hereinafter referred to as cycle A and cycle B).). A pulse train can comprise, for example:

A synchronization pulse (hereinafter sync pulse);
Eight (8) control channels; and
64×n I/O channels where n=1 . . . 32 (i.e. 64 to 2048 I/O channels). As will be described below in connection with FIGS. 9A and 9B, each I/O channel toggles its inbound and outbound state on alternating cycles, allowing for unit detection (and removal detection) and providing improved noise immunity of false triggers.

By way of an example, the control channels can comprise 8 system control bits (e.g., Bits 1 through 8) wherein Bit 1 is a cycle sync indicator that is set to indicate whether the current pulse train is an A scan cycle or a B scan cycle. One or more designated system control bits can be unassigned to allow for future system configuration or control settings. For example, Bits 4 and 7 can be spare bits that can be assigned a system control function at a later date. The outgoing bits for Bits 4 and 7 are set as spaces for all cycles. The inbound bits for Bits 4 and 7 are not set by any line module 22. A Bit 5 can be designated as an emergency interrupt mode enabled indicator. In other words, if this bit is set by the channel generator 12, then a special priority interrupt mode is enabled for transmitters to indicate an emergency situation. If the priority interrupt feature is enabled, then Bit 5 is set in both of the A and B scan cycles. Bit 6 is a force multilink mode indicator for system diagnostic purposes, four example. Information can be requested from specific registers in this mode such as, for example, device 22 type, serial number, device status, and so on. If Bit 6 is set, then any safety functions automatically go to the safe state. Bit 6 can be used to force channels 1 to 16 to a multilink mode for all devices 22 programmed on these addresses such that these devices 22 will not transmit unless specifically addressed in a multilink protocol, as will any other device 22 addressed by the multilink protocol. Bits 2 and 3 can be a digital transmission sync bits that mark the beginning of, for example, a 12 bit data+4 bit CRC digital transmission where Bit 2 indicates a 2 bit per cycle transmission, Bit 3 indicates an 8 bits per cycle transmission and the combination of both Bits 2 and 3 indicate the transmission of 16 bits per cycle and are thus set as a mark state on the $8^{th}$, $2^{nd}$ or every pulse train cycle respectively. Bit 8 can be a fault bit such that, in the event of a system fault being detected by the channel generator 12, the outgoing fault bit is set as a mark to indicate the fault condition to the rest of the system 10. Likewise, if a major system fault is detected by one of the modules 22 (e.g., such as a failure of a safety function), the incoming fault bit is set as a mark and the channel generator 12 in turn sets the outgoing bit. Each individual I/O module can also indicate a failed state by driving both cycles of the scan with a mark on the incoming channel. It is understood that different types of, and more or less number of, control channels or control bits can be used in a pulse train scan cycle A or B.

Figure 6A:
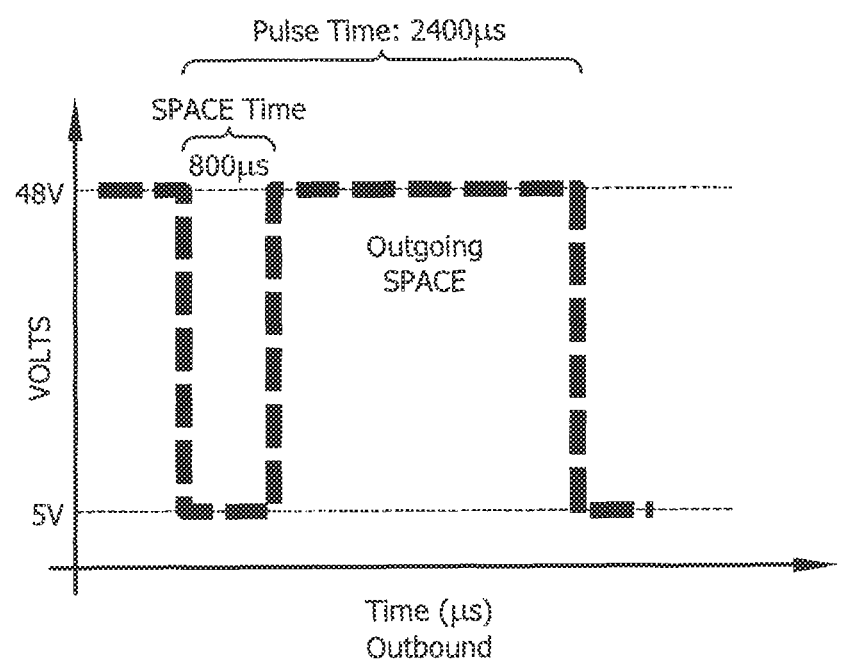
FIGS. 6A and 6B are signal diagrams illustrating outbound channel pulse timing of a data communication bus protocol in accordance with an embodiment of the present invention.
Figure 6B:
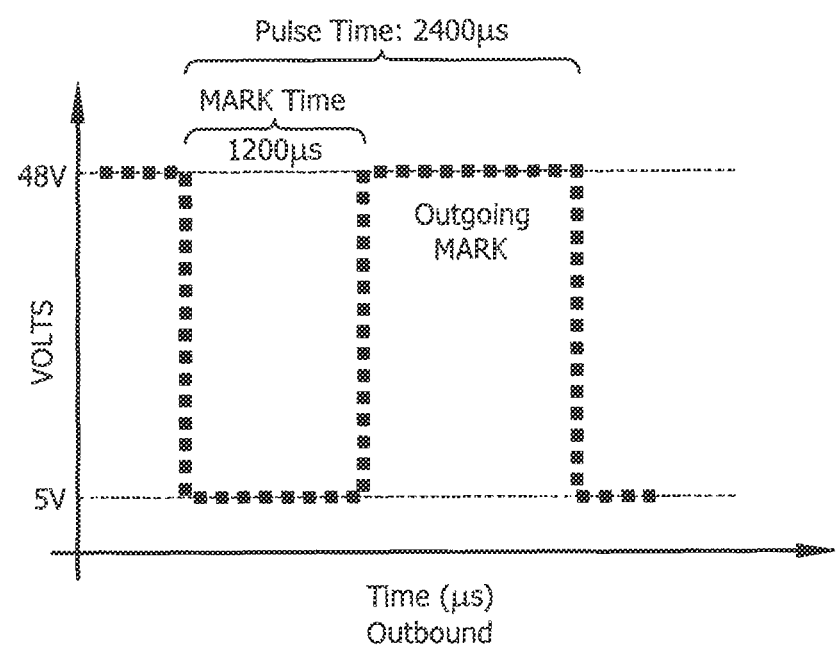

FIGS. 6A and 6B depict illustrative outbound pulse timing. For example, at the start of a channel, the signal drops from the high voltage level to the low voltage level. A 'space' is 800 μs (e.g., or ⅓ of the channel bandwidth) of low voltage level before returning to the high voltage level for the remaining time of the channel's bandwidth of 1600 μs. A 'mark' is 1200 μs (e.g., or ½ of the channel bandwidth) of low voltage level before returning to the high voltage level for the remaining time of the channel's bandwidth of 1200 μs (e.g., or ½ of the channel bandwidth again).

Figure 7A:
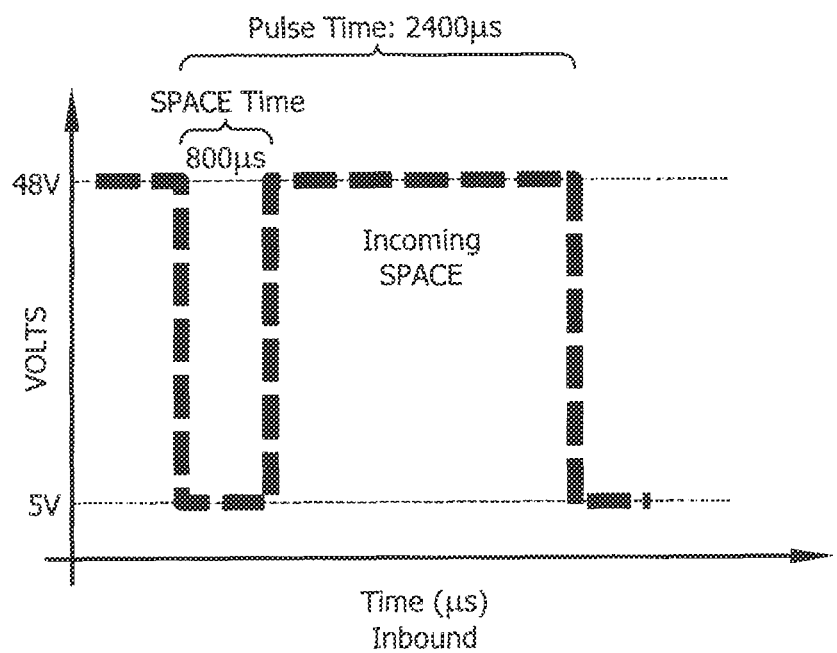
FIGS. 7A and 7B are signal diagrams illustrating inbound channel pulse timing of a data communication bus protocol in accordance with an embodiment of the present invention.
Figure 7B:
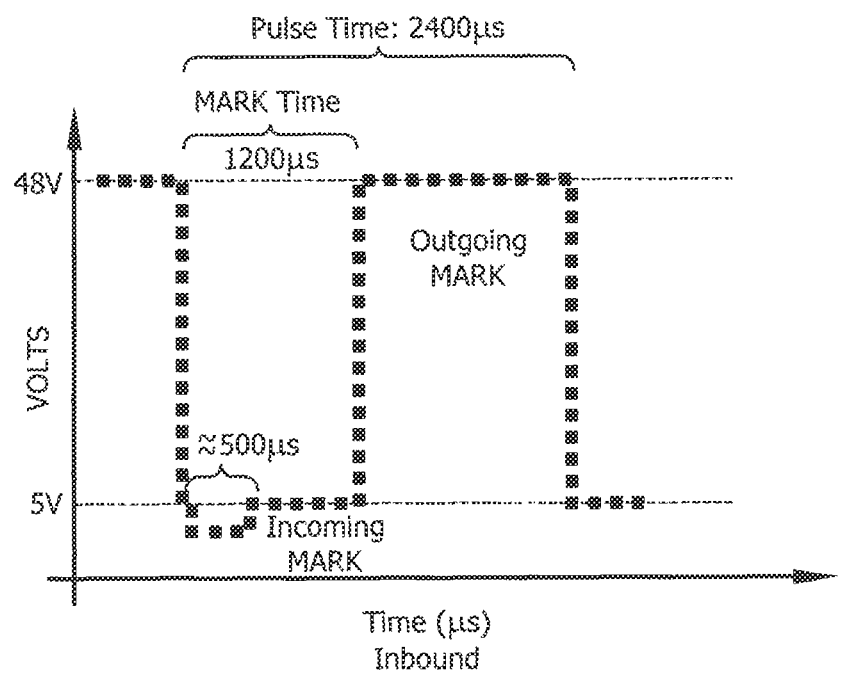

FIGS. 7A and 7B depict illustrative inbound pulse timing. A transmitter (e.g., in a device 22) which has detected its channel in a pulse train cycle can either pull-down on the bus 20 or it can be passive. The pull down is made during the first 500 us and is detected by the channel generator 12 via current measurement. For normal I/O channels, once a valid pull down has been detected, the channel generator 12 will delay the rising edge of the pulse by an additional 400 us. It is this additional delay to the rising edge of the pulse that other appropriately coded receivers (e.g., in devices 22) detect and act upon. Because the pulse train and modulation is present along the entire length of the bus 20, receivers may be placed at any convenient point along the bus to monitor a channel for local output. In fact, many receivers may monitor the same channel or transmitter.

With reference to FIG. 9A and the table in FIG. 9B, each I/O channel toggles its inbound and outbound pulse-pair state on alternating cycles, allowing for unit detection (and removal detection), detection of stuck transmitters and providing improved noise immunity of false triggers. For example, each pulse train's I/O channels pulse-pair carry 1 bit of inbound and outbound data. If an inbound pulse is set, then the channel generator 12 sets the outbound state for that pulse. The channel generator may also set the outbound state independent of the inbound state. In normal operation, the channel states in the A-pulse train or A-cycle and in the B-pulse train or B-cycle are inverted states. In other words, if the inbound and outbound state of channel 2 is "ON" in the A-pulse train with a space-mark pulse pair, then it has a mark-space pulse-pair in the B-pulse train. Likewise, if the inbound and outbound state of Channel 3 is "OFF" in the A-pulse train with a mark-space pulse pair then it has a space-mark pulse pair in the B-pulse train. The exceptions to this are (1) a transmitter missing or having failed and then the channel pulse-pair in both pulse trains is space; (2) a transmitter indicating fault condition and then the channel pulse-pair in both pulse trains is a mark; and (3) channels carrying data which transmit 2-bits of data (of a 12 bit value plus 4 bit CRC) consecutively each pulse train cycle.

With continued reference to FIG. 9A, a complete scan of the bus 20 consists of two complete cycles of the pulse train (e.g., cycle A and cycle B) For illustrative purposes in FIG. 9A, channel 3 is shown transmitting an 'OFF' state, channel 2 is shown transmitting an 'ON' state, channel 4 is transmitting a fault state and there are no other devices present on other channels. Pulse train A has:
  a sync pulse;
  8 control channels (1st control channel is a 'mark' to indicate cycle A); and
  a number of I/O channels which each consist of a pair of pulses.
  Channel 3 is transmitting an 'OFF' state so it has a mark-space pulse-pair in the A cycle.
  Channel 2 is transmitting an 'ON' state so it has a space-mark pulse-pair in the A cycle.
  Channel 4 is transmitting a FAULT state so it has a mark-mark pulse-pair in the A cycle.
  All other channels have transmitters off.
Pulse train B has:
  a sync pulse;
  8 control channels (1st control channel is a 'space' to indicate cycle B); and
  a number of I/O channels which each consist of a pair of pulses.
  Channel 3 is transmitting an 'OFF' state so it has a space-mark pulse-pair in the B cycle.
  Channel 2 is transmitting an 'ON' state so it has a mark-space pulse-pair in the B cycle.
  Channel 4 is transmitting a FAULT state so it has a mark-mark pulse-pair in the B cycle.
  All other channels have transmitters off.
Accordingly, with reference to FIG. 9A and the table in FIG. 9B, each I/O channel toggles its inbound and outbound pulse-pair state on alternating cycles, allowing for unit detection (and removal detection)), detection of stuck transmitters and providing improved noise immunity of false triggers.

Figure 8A:
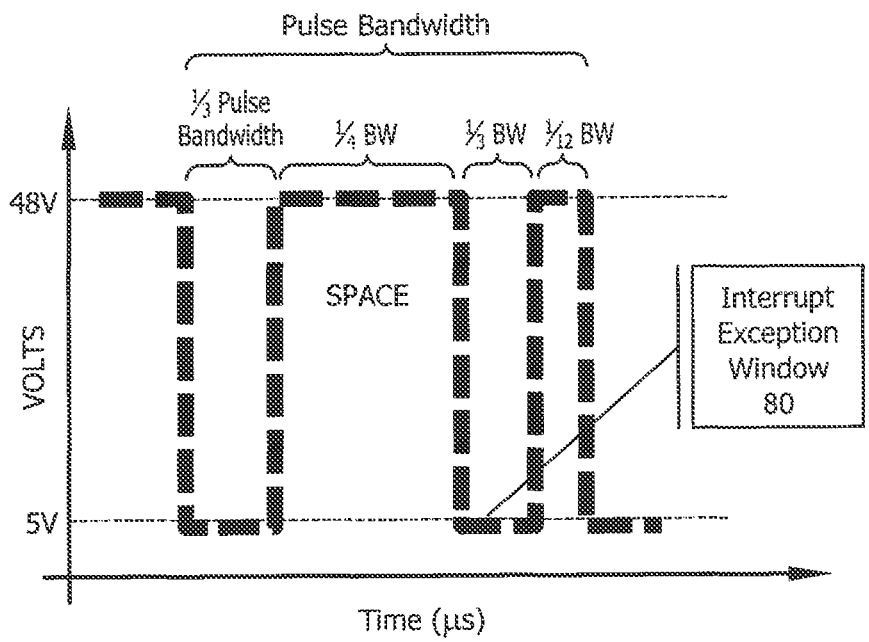
FIGS. 8A and 8B are signal diagrams illustrating an exception window interrupt in an I/O channel in accordance with an embodiment of the present invention.
Figure 8B:
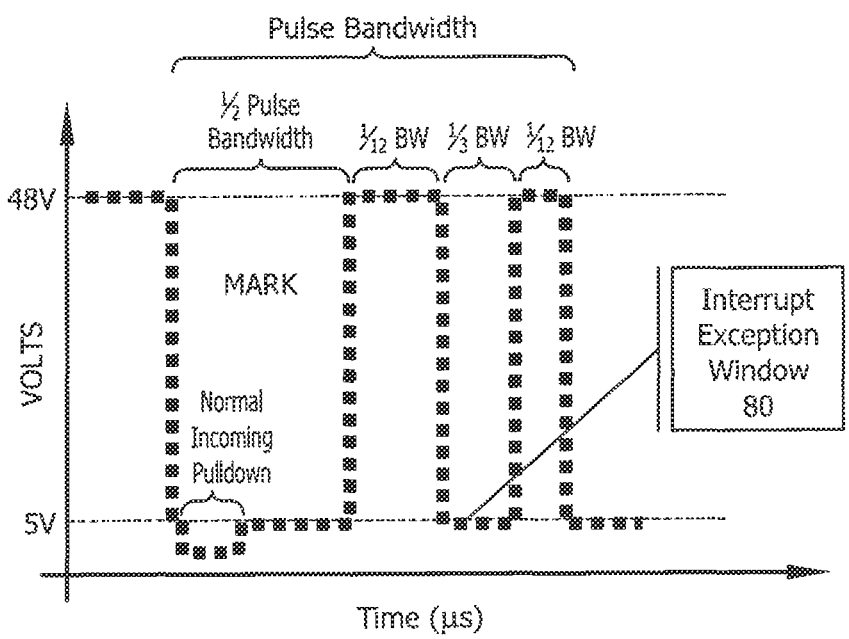
Figure 11:
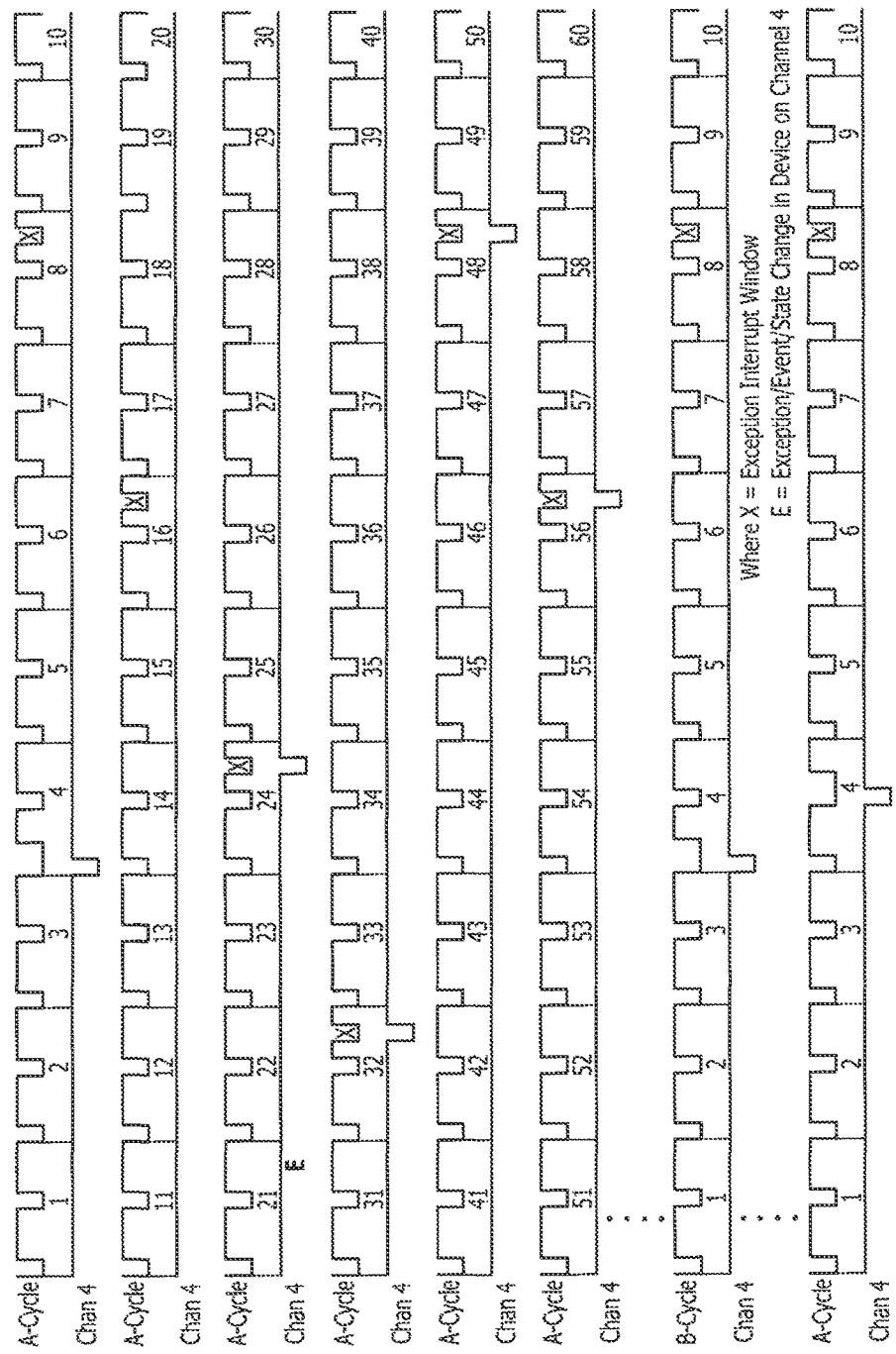
FIG. 11 is a diagram a pulse train cycle with exception window interrupts in accordance with an embodiment of the present invention.

The I/O and control system 10 may have a longer reaction time due to the dual scan protocol, the pulse-pair channel, and its ability to support an increased number of channels and larger channel bandwidth in comparison to the aforementioned SILBUS conveyor control system and similar systems. To reduce the system 10 reaction time, the channel generator 12 can be configured to enable a global exception pulse or interrupt exception window 80 in accordance with an illustrative embodiment of the present invention. For example, with reference to FIGS. 8A, 8B and 11, the channel generator 12 can be configured to enable a global exception pulse within the normally "high" period of the second pulse of every $8^{th}$ channel or other interval (e.g., every $n^{th}$ channel). The channel generator 12 will produce a low signal at the $7/12$ point of the channel window time lasting for $1/3$ of the channel bandwidth to create an interrupt exception window. This exception window 80 is generally not generated in the last group of 8 I/O channels so as not to interfere with sync pulse detection algorithms. It is to be understood that the exception window can be driven at any designated interval besides every $8^{th}$ channel, and at any point during the high voltage level portion of a channel whose duration is dependent on the current channel timing configuration of the system 10 (e.g., 1.2 ms or 2.4 ms or 4.8 ms, among others). For example, the point at which the global exception pulse or exception window is enabled within the normally "high" period of every $n^{th}$ channel can vary as long as it is after the delay point in a channel or pulse at which a mark is generated. The duration of the exception window and the amount of bandwidth available in the pulse or cycle following the exception window can also vary and need not be $1/3$ and $1/12$ of the channel bandwidth respectively. In other words, different proportions of pulse or cycle can be allocated to the portions of the channel bandwidth between in the initiation point of a mark and an interrupt exception window, the duration of the interrupt exception window and the remaining channel bandwidth following the interrupt exception window.

Figure 12:
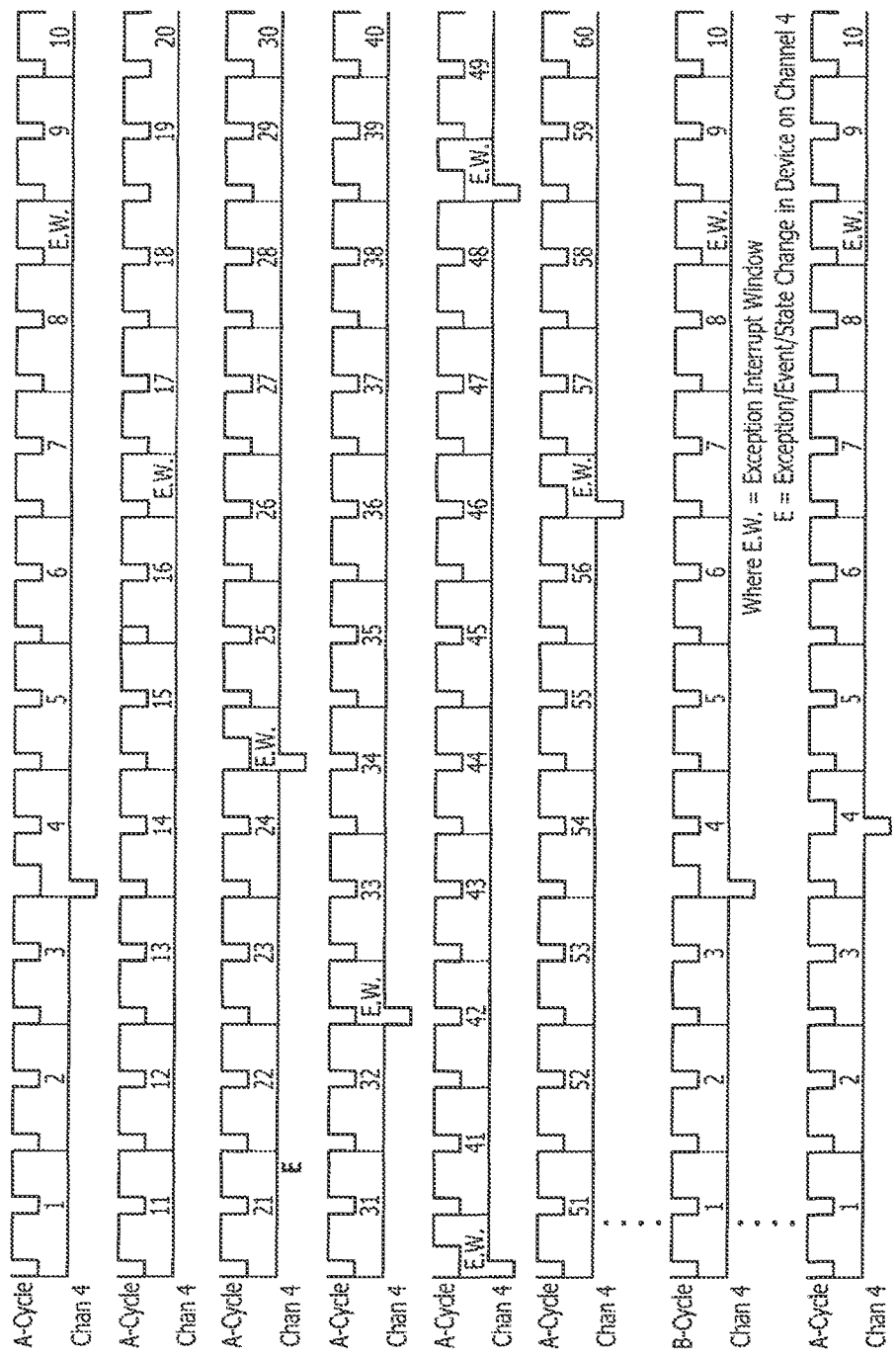
FIG. 12 is a diagram a pulse train cycle with exception pulse window interrupts in accordance with an embodiment of the present invention.

Similarly, to reduce the system 10 reaction time, the channel generator 12 can be configured to enable an additional global exception pulse in accordance with an illustrative embodiment of the present invention. For example, with reference to FIG. 12, the channel generator 12 can be configured to enable an additional global exception pulse after the second pulse of every $8^{th}$ channel or other interval (e.g., every $n^{th}$ channel). The channel generator 12 will produce a standard pulse of the channel bandwidth to create an interrupt exception window. It is to be understood that the exception window can be driven at any designated interval besides every $8^{th}$ channel. The duration of the exception window and the amount of bandwidth available in the pulse or cycle following the exception window can also vary and need not be the standard channel bandwidth. In other words, different proportions of pulse or cycle can be allocated to the portions of the channel bandwidth between in the initiation point of a mark and an interrupt exception window, the duration of the interrupt exception window and the remaining channel bandwidth following the interrupt exception window.

Any transmitters that have tripped may then pull the signal low during an exception window so that the channel generator 12 may then detect the exception. The transmitter will continue to drive the following exception windows until it has transmitted its state via the normal dual scan bus cycle and the channel generator 12 is then aware of which transmitter(s) have triggered the interrupt. A minimum of 3 exception interrupt windows, for example, can be required before the channel generator 12 considers the interrupt valid to reduce the possibility of false trips. Other numbers of exception interrupt windows within the normal dual scan bus cycle can be required before the exception is considered valid for that device. By way of an example and with reference to FIG. 10, the advantages a global exception pulse or interrupt exception window in accordance with an illustrative embodiment of the present invention are illustrated worst case response times (e.g., 3×8 channels+a sync pulse+last 8 I/O channels+8 control channels) which is significantly less than reactions times experienced in a system employing a dual scan protocol and having no exception window capability (e.g., requiring a I/O module or device 22 to wait until its next assigned channel window in the course of the dual scan bus cycle).

If additional output devices other than the channel generator 12 need to be aware of the exception interrupts, the channel generator 12 can be configured to drive known channels (i.e., known to or configured in the system 10) at the required intervals to broadcast the interrupts to other devices on the bus.

Additional Embodiments and Implementations

Illustrative embodiments of the present invention have been described with reference to operations at a programmable device such as a channel generator 12 or I/O module or device 22. It is to be understood, however, that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, DVDs, magnetic tapes, floppy disks, optical data storage devices. It is envisioned that aspects of the present invention can be embodied as carrier waves (such as data transmission through the Internet via wired or wireless transmission paths). The computer-readable recording medium can also be distributed over network-coupled computer systems so that the computer-readable code is stored and executed in a distributed fashion.

The components of the illustrative devices, systems and methods employed in accordance with the illustrated embodiments of the present invention can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the present invention can be easily construed as within the scope of the invention by programmers skilled in the art to which the present invention pertains. Method steps associated with the illustrative embodiments of the present invention can be performed by one or more programmable processors executing a computer program, code or instructions to perform functions (e.g., by operating on input data and/or generating an output). Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD ROM disks. The processor and the memory can be supplemented by, or incorporated in special purpose logic circuitry.

The above-presented description and figures are intended by way of example only and are not intended to limit the present invention in any way except as set forth in the following claims. It is particularly noted that persons skilled in the art can readily combine the various technical aspects of the various elements of the various illustrative embodiments that have been described above in numerous other ways, all of which are considered to be within the scope of the invention.

What is claimed is:

1. A method of implementing a bus protocol for interfacing a control unit to plural devices connected to the bus comprising:

generating a pulse train comprising a plurality of cycles for transmission on the bus, each of the cycles comprising a low voltage level portion for a designated period of time and a high voltage level portion for a designated period of time that indicates a space, at least some of the cycles corresponding to respective channel windows assigned to respective ones of the plural devices, each of the plural devices being able to indicate a state to the control unit by pulling down voltage on the bus during the low voltage level portion of its channel window and the channel unit responding by delaying a rising edge of the high voltage level pulse a selected amount of time in the channel window to indicate a mark;

wherein the pulse train employs dual scan bus cycles comprising alternating A and B scan cycles where each A scan cycle and each B scan cycle comprises the Channel windows and at least one of control bits and synchronization bits, the plural devices and control unit are synchronized to ensure that the plural devices transmit and receive during their corresponding channel windows and that, when the control unit samples the pulse train during the channel windows, the control unit associates the samples to the corresponding ones of the plural devices, and the dual scan bus cycles are employed to indicate in the one more channel windows corresponding to each of the plural devices any one of four states comprising Device ON, Device OFF, Fault and No Device using binary combinations of a mark and a space in the channel windows of the A and B scan cycles that are assigned to a selected one of the plural devices, and at least one of the channel windows in at least one of the A and B scan cycles is configured to have an exception interrupt window comprising a second low level portion of selected duration during which the control unit can detect a low level signal provided by at least one of the plural devices by a pull down of the voltage on the bus during the pulse train but outside of its assigned channel window.

2. The method of claim 1, wherein the control unit can detect the low level signal provided by at least one of the plural devices during an exception interrupt window in at least one of the A and B scan cycles prior to detecting the low level signal provided by that device in its next assigned channel window in the dual scan bus cycles of the pulse train.

3. The method of claim 1, further comprising designating the detection of a low level signal from one of the plural devices in at least a selected number of the exception interrupt windows before an interrupt is valid to the control unit.

4. The method of claim 1, further comprising generating the pulse train to have the exception interrupt window in the high voltage level portion of at least one of the plurality of cycles.

5. The method of claim 4, wherein the high voltage level portions in the cycles can vary in duration within a cycle depending on Whether they are pulse width modulated as a mark or a space, and mark timing and space timing being designated such that the pulses having a mark are initiated later in their respective cycles than the pulses having a space, and the generating of the exception interrupt window is initiated later in their corresponding cycles than the mark timing.

6. The method of claim 1, further comprising generating the pulse train to have the exception interrupt window in each of a selected number of the plurality of cycles in at least one of the A and B scan cycles.

7. The method of claim 1, further comprising generating the pulse train to have the exception interrupt window in each of a selected number of the plurality of cycles in each of the A and B scan cycles.

8. The method of claim 7, wherein the pulse train is generated to have the exception interrupt window in selected intervals of the plurality of cycles in each of the A and B scan cycles.

9. The method of claim 1, further comprising broadcasting an interrupt detected via the exception interrupt window to other devices on the bus.

10. A method of implementing a bus protocol for interfacing a control unit to plural devices connected to the bus comprising:

generating a pulse train comprising a plurality of cycles for transmission on the bus, each of the cycles comprising a low voltage level portion for a designated period of time and a high voltage level portion for a designated period of time that indicates a space, at least some of the cycles corresponding to respective channel windows assigned to respective ones of the plural devices, each of the plural devices being able to indicate a state to the control unit by pulling down voltage on the bus during the low voltage level portion of its channel window and the channel unit responding by delaying a rising edge of the high voltage level pulse a selected amount of time in the channel window to indicate a mark;

wherein the pulse train employs dual scan bus cycles comprising alternating A and B scan cycles where each A scan cycle and each B scan cycle comprises the channel windows and at least one of control bits and synchronization bits, the plural devices and control unit are synchronized to ensure that the plural devices transmit and receive during their corresponding channel windows and that, when the control unit samples the pulse train during the channel windows, the control unit associates the samples to the corresponding ones of the plural devices, and the dual scan bus cycles are employed to indicate in the one more channel windows corresponding to each of the plural devices any one of four states comprising Device ON, Device OFF, Fault and No Device using binary combinations of a mark and a space in the channel windows of the A and B scan cycles that are assigned to a selected one of the plural devices, and at least one of the A scan cycle and the B scan cycle further comprises an exception pulse at selected intervals among the channel windows, the exception pulse providing an interrupt exception window and having a low level portion during which the control unit can detect a low level signal provided by at least one of the plural devices by a pull down of the voltage on the bus during the pulse train but outside of its assigned channel window.

11. The method of claim 10, wherein an exception pulse is generated after a channel window corresponding to every $n^{th}$ one of the plural devices in a pulse train scan cycle.

12. The method of claim 10, wherein the interrupt exception window has same channel bandwidth as each of the channel windows in the corresponding pulse train scan cycle.

13. The method of claim 10, wherein duration of the interrupt exception window and the amount of bandwidth available in the cycle following the interrupt exception window are different from the channel bandwidth of the charm& windows preceding the interrupt exception window.

14. The method of claim 13, wherein different proportions of a cycle can be allocated to the portions of the channel bandwidth between in an initiation point of a mark in a channel window and an interrupt exception window occurring thereafter.

* * * * *